United States Patent [19]
Harding

[11] Patent Number: 4,780,966
[45] Date of Patent: Nov. 1, 1988

[54] SPARGE PIPE ASSEMBLY FOR FLUIDISED BED

[76] Inventor: Brian Harding, The Mynde, Lingen, Bucknell, Shropshire, England

[21] Appl. No.: 928,209

[22] PCT Filed: Feb. 19, 1986

[86] PCT No.: PCT/GB86/00082
§ 371 Date: Oct. 2, 1986
§ 102(e) Date: Oct. 2, 1986

[87] PCT Pub. No.: WO86/04833
PCT Pub. Date: Aug. 28, 1986

[30] Foreign Application Priority Data
Feb. 22, 1985 [GB] United Kingdom ......... 8504557
Mar. 19, 1985 [GB] United Kingdom ......... 8507078

[51] Int. Cl.⁴ .................................. F26B 17/10
[52] U.S. Cl. .................................. 34/57 A; 34/57 B; 34/57 E
[58] Field of Search ......... 422/139; 34/57 A, 57 B, 34/57 E, 10; 432/15, 58

[56] References Cited
U.S. PATENT DOCUMENTS

| 3,740,865 | 6/1973 | Laguilharre | 34/57 E |
| 4,032,300 | 6/1977 | Packer . | |
| 4,241,021 | 12/1980 | Skrzec | 34/57 A |
| 4,606,135 | 8/1986 | Morin | 34/57 A |

FOREIGN PATENT DOCUMENTS

| 2012277 | 10/1971 | Fed. Rep. of Germany . |
| 7437929 | 6/1975 | France . |
| 2037959 | 7/1980 | United Kingdom . |

Primary Examiner—Larry I. Schwartz
Attorney, Agent, or Firm—Holman & Stern

[57] ABSTRACT

A fluidized bed of the kind comprising a container (10) in which is disposed a mass of particulate material (11), there being also provided a sparge pipe assembly such as pipes (14, 15, 16 and 17) which are connected by one or more feed pipes (18 and 19) which are themselves connected externally of the container to a supply of fluidizing gases. Said sparge pipes are provided with outlet apertures or nozzles (28) through which the fluidizing gases can flow into said particulate material. The or each of said sparge pipes is of endless configuration and the fluidizing gases are recirculated within said endless sparge pipes by means of one or more tangentially inclined injectors (21).

11 Claims, 3 Drawing Sheets

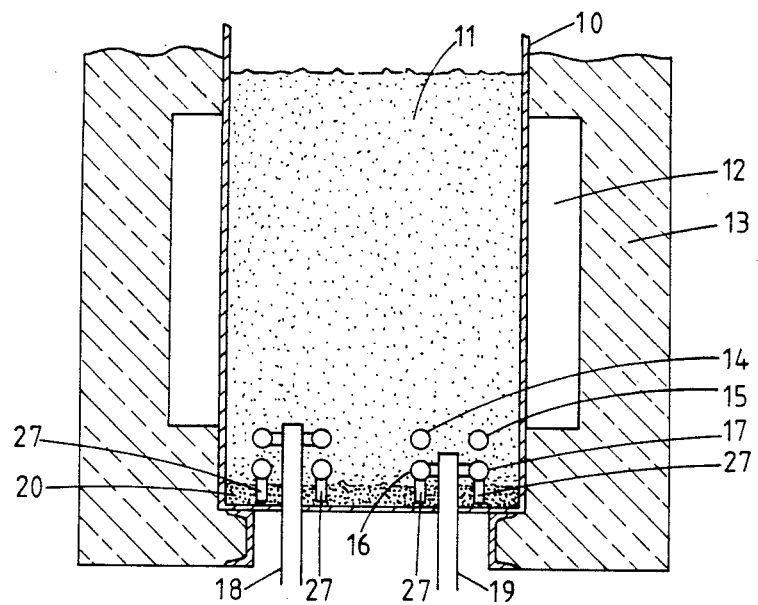
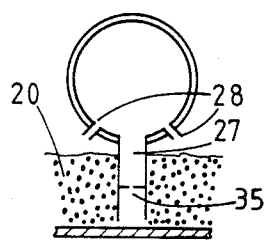
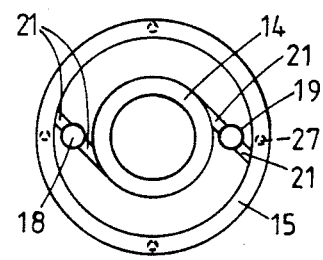
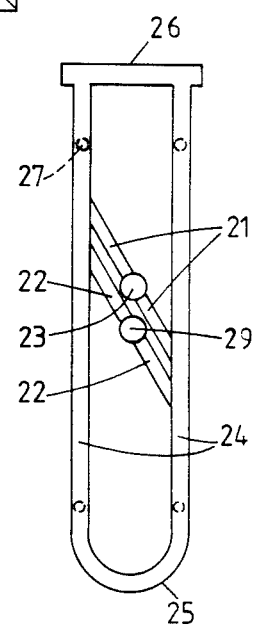
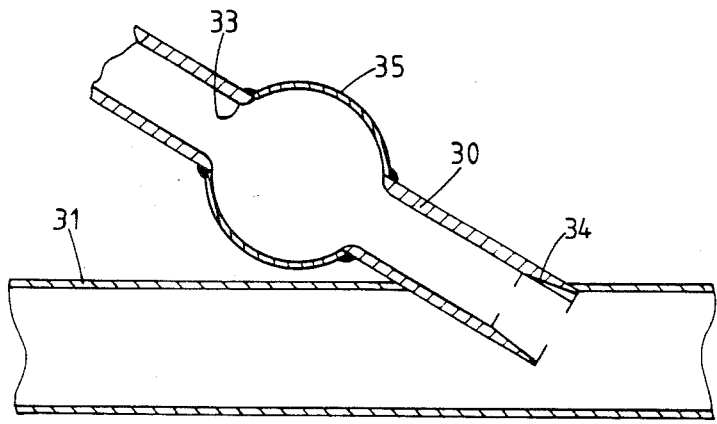
FIG.1.
FIG.2.
FIG.3.
FIG.4.
FIG.5.

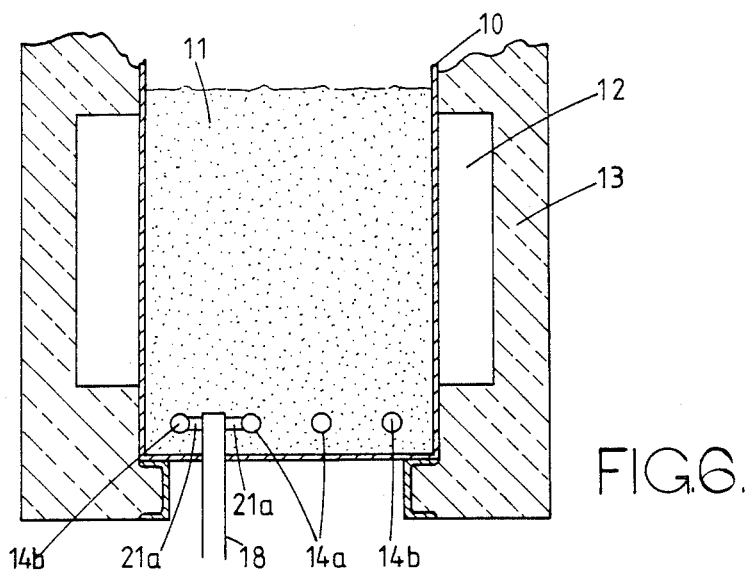
FIG. 6.
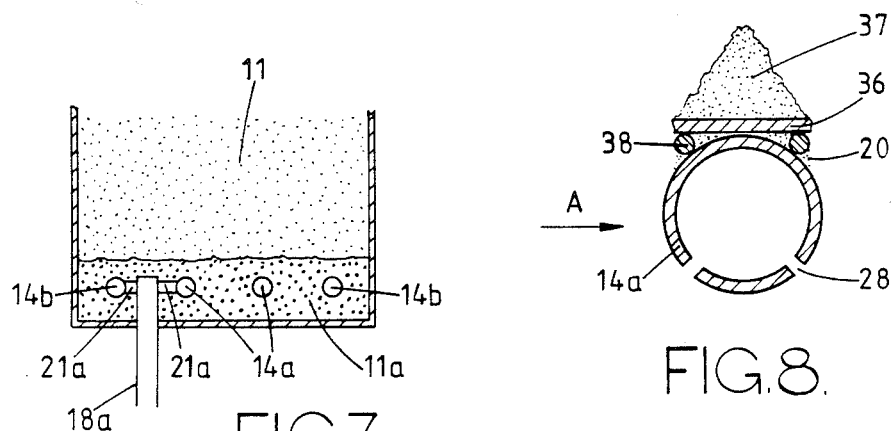
FIG. 7.
FIG. 8.
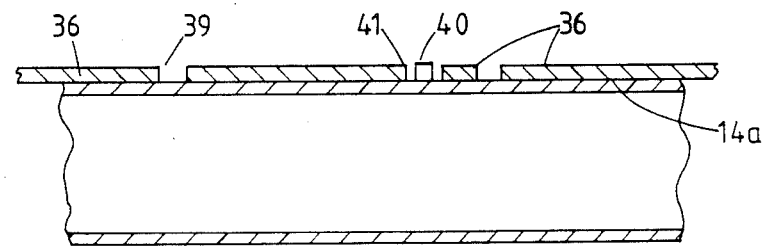
FIG. 9.

SPARGE PIPE ASSEMBLY FOR FLUIDISED BED

CROSS REFERENCE TO RELATED APPLICATION(S)

This United States application stems from PCT International Application No. PCT/GB86/00082 filed Feb. 19, 1986.

FIELD OF THE INVENTION

This invention relates to a fluidised bed containing a mass of particulate material which can for example be in the form of granulated solid fuel or ash that results from combusting solid fuel. Alternatively the bed may consist of refractory particles used, inter alia, for the heat treatment of a component or components immersed in the bed, for removal of plastics or paints or contaminants from such components or for any other purpose in which said component or components are required to be immersed in a predetermined atmosphere and within a predetermined temperature range. Further uses are in connection with various chemical reactions or where the aforementioned components are of such a size that they may themselves be fluidised in order to achieve a chemical reaction or heat treatment. A further application is where refractory particles are used to transfer heat from a hot fluidising gas to a heat exchanger so that heat is transferred from the fluidising gas to a separate gas or liquid. In all the aforementioned cases however it is to be understood that, in use, the aforementioned particulate material or refractory particles are fluidised by means of a fluidising gas which is admitted into the bed.

BACKGROUND ART

Hitherto, the particulate fluidising media have been supported on a diffusion tile, which tile may be made from a porous ceramic or porous metal, or from a metal plate punched or machined with a plurality of apertures. Difficulties can, however, arise in using such diffusion tiles. For example, all such tiles are difficult to seal around their periphery and it is not easy to replace damaged or worn tiles. Furthermore, problems arise from differential thermal expansions which may give rise to cracked ceramic tiles or buckled metal tiles. Also holes or apertures in metal tiles are frequently clogged by the fluidising media or by solid residues in some fluidising gases. Yet another disadvantage of using diffusion tiles is that it is not possible to keep separate different components of the fluidising gas before it enters the bed. Such separation is necessary if the gaseous components form an ignitable or explosive mixture because light-back may occur through the diffusion tile or the tile may be overheated as a result of flame burning on its surface.

To overcome some of the aforementioned disadvantages it has previously been proposed to make an apertured tube or sparge pipe assembly located within the container adjacent to its base and connected to a source of fluidising gas disposed outside the container. Such an arrangement possesses disadvantages. When in a non-fluidising or rest condition some of the particulate fluidising material may enter the sparge pipe via the apertures and thereby subsequently impair the efficiency of the distribution of fluidising gas and in some cases actually block all or part of the sparge pipe. Another disadvantage results from the fact that, in order to avoid lateral pressure drops in the length of the sparge pipe, the fluidising gases are introduced to said pipes at a plurality of points along their length by supply tubes which are fixed to the relatively cool base of the container, and this arrangement results in differential thermal movements of the sparge pipe relative to the supply pipes which, in turn, gives rise to distortion and cracking of the assembly. Yet another problem is that the sparge pipe is usually unevenly heated so that, for example, the top of the pipe in the fluidising area of the bed becomes hotter than the bottom of the pipe adjacent to the cooler container base. This causes distortion of the sparge pipe along its lateral axis. Yet another disadvantage is that particulate fluidising material in a deep bed suffers from a hysteresis effect at the onset of fluidisation. This is caused by initial differential pressures along the length of the sparge pipe, so that gases emitted from apertures adjacent to high pressure zones in the pipe will clear a channel in the particulate fluidising material, thus reducing the pressure drop of gases exiting from said apertures. This initiates a fluidic or directional gas flow effect so that gases preferentially exit in apertures of low pressure drop while the remaining apertures in the sparge pipe do not clear and thereby do not achieve an adequate flow, thereby causing uneven fluidisation of the bed.

One object of the present invention is therefore to provide an improved fluidised bed which avoids the above-mentioned disadvantages.

SUMMARY OF THE INVENTION

In accordance with the present invention there is provided a fluidised bed comprising a container, a mass of particulate material disposed within the container and an apertured tube or sparge pipe assembly for introducing fluidising gas into the said particulate material, which assembly is supported within the container adjacent to and spaced from the bottom thereof and connected to a supply of fluidising gas disposed externally of the container, characterised in that said sparge pipe assembly comprises at least one sparge pipe which is of endless configuration that permits the fluidising gas to circulate freely in the sparge pipe when said gas is injected therein in a non-radial direction so as to impart a recirculating motion to the gas.

The or each sparge pipe of said sparge pipe assembly may be provided with a plurality of short nozzles or drilled holes forming fluidising gas outlets, a single fluidising gas supply injector tangentially located to the said sparge pipe lateral axis imparting a circulatory motion to the gas within each sparge pipe. The recirculatory velocity of the fluidising gas is normally arranged to be greater than the saltation velocity of the particulate material entering the sparge pipe so that any particulate material in said pipe is quickly ejected. It should be noted that once minimum recirculation of the gas is established the pressure along the length of the apertured sparge pipe will be equal at all points, thus ensuring even fluidisation of the bed. In practice, it is desirable to achieve a recirculating gas velocity in the sparge pipes sufficiently great to transfer heat from hot zones to cooler zones or alternatively to transfer heat from the hot recirculating gases in order to uniformly heat the sparge pipe. Thus distortion of the sparge pipes is minimised. The inner surface of the or each sparge pipe may also be oxidised to further assist radiant heat transfer across the sparge pipe axis.

The sparge pipe assembly in one arrangement may include at least one pipe of endless configuration which comprises two parallel generally straight portions connected together at their adjacent ends by a pair of end portions and in this case it is sometimes possible to use a separate injector for each of said straight portions at or near the centre of its length, both injectors thus provided being connected together and in communication with a separate feed pipe. Such an arrangement is possible because the effect of differential expansion is negligible when the distance between said straight portions is small compared with the overall length of said portions.

The or each injector is designed to give a low pressure drop to the fluidising gas and when more than one sparge pipe is used in the assembly it is necessary to ensure that the combined gas flow pressure drop across each injector and related total area of sparge pipe apertures must be the same for each sparge pipe and injector in the assembly.

The recirculation of the fluidising gas within a sparge pipe assembly confers several advantages compared with previously known designs, for example, ejection of any particulate material from the pipe assembly can be readily accomplished. A further advantage is that gas pressure is constant throughout the sparge pipe assembly thus permitting low pressure drop across the pipe apertures, while still ensuring even bed fluidisation. Equalisation of any potential sparge pipe temperature differentials is yet another advantage in preventing thermal distortion. Distortion can also be minimised by, desirably, using a single fluidising gas injector attachment point, which arrangement permits virtually unrestrained thermal movement of the sparge pipe assembly.

Substantially constant gas pressures are achieved along the length of the or each sparge pipe but it has been found in addition that a small upward flow of gas from beneath the sparge pipe assembly can be used to act as a lubricant to the particles in the fluidised bed and this also considerably reduces the aforementioned particle locking or hysteresis effect. The volume of the "lubrication" gas required is less than 10% of the total fluidising gas flow and this is obtained by injecting the "lubricating" gas into a layer of relatively coarse and/or relatively dense particles adjacent to the bed container base and situated below the sparge pipe assembly. An endless sparge pipe assembly providing for recirculation of the fluidising gases as above described may, however, give rise to a problem when the temperature of the fluidised bed itself is sufficiently higher than the temperature of the gases entering the sparge pipe assembly, in which case the recirculating gases will receive heat by convection from the sparge pipe wall so that the gas temperature will be higher after recirculating than it is immediately after injection into the sparge pipe. Thus gases exiting from a sparge pipe hole or aperture immediately after injection will have different flow characteristics from those of the hotter gases exiting from a similar hole or aperture after recirculation has occurred.

A further problem may arise if the upper section of the sparge pipe is in a fluidised or partly fluidised region of the fluidised bed and is thus subject to relatively high heat transfer rates between the fluidised bed and the sparge pipe wall whilst the lower section of said sparge pipe is in a slumped or non-fluidised region of the fluidised bed so that little or no heat transfer takes place between such slumped or non-active region of the fluidised bed and the adjacent part of the wall of the sparge pipe. The resulting temperature difference between the upper and lower sections of the sparge pipe is minimised by conduction through the sparge pipe wall, internal radiation and convective heat transfer to the recirculating gases, but the sum of such corrective heat transfer is sometimes not sufficient to prevent unacceptable temperature differences between the upper and lower sections of the sparge pipe wall, which temperature difference results in problems of differential thermal expansion along the axis of the sparge pipe which may cause lateral buckling or distortion. The effect of gross variations between the temperature of the fluidised bed and the temperature of the incoming fluidising gases may be reduced by pre-heating the incoming or injected gases to a temperature that is preferably at least within 400° C. of the bed temperature, thus reducing heat transfer between the circulating gas and the sparge pipe wall. Alternatively, the sparge pipe may be so designed that the upper section of the sparge pipe is insulated from the high heat transfer flux which occurs as a result of contact with a fluidised or partly fluidised region of the fluidised bed. Such insulation may be accomplished in several ways, for example the sparge pipe may be covered with a layer of denser and/or coarser particles that do not become fluidised at any fluidising gas flow rates that might be envisaged for a particular application. Alternatively or in addition the upper section of the sparge pipe may be protected by a thermal insulator from the active or fluidised region of the bed. A further means of accomplishing said insulation is by modification of the upper section of the sparge pipe so that the particles of the bed immediately above or in contact with the upper section of the sparge pipe do not become fluidised so that they will act as a thermal insulator between the fluidised part of the bed and the upper section of the sparge pipe wall. In the case of high temperature beds operating at, for example, temperatures of at least 900° C. it is however desirable to pre-heat incoming fluidising gases and also to provide thermal insulation for the upper section of the sparge pipes.

Pre-heating of incoming fluidising gases (if used) may be accomplished by any convenient means.

There is a further problem which may arise when the fluidising gases are first admitted from the sparge pipe assembly into a fluidised bed which is in a slumped or an at rest condition. Thus the slumped particulate material may so dispose itself as to cause significant inequalities in the pattern of flow of the fluidising gases leaving the sparge pipe assembly and in the worst cases some part or parts of the bed may remain in a slumped or non-fluidised condition whilst other parts of the bed may be too vigorously fluidised or over fluidised. This problem can in some instances be overcome by vibrating the fluidised bed or by stirring or agitating the contents thereof but a further advantageous feature of the present invention envisages the provision of a shield assembly which can be combined with a sparge pipe so as to result in the formation of a cavity immediately below the sparge pipe when the fluidised bed is in a slumped or at rest condition. Such a cavity will then permit the fluidising gases to exit freely from the nozzles or outlets of the sparge pipe, thus promoting an even flow of the fluidising gases upwardly through the bed and preventing or inhibiting any inequalities in the rate of flow of such gases such as may otherwise cause locally slumped regions in the bed.

The invention will now be more particularly described with reference to the accompanying drawings wherein

DESCRIPTION OF THE DRAWINGS

FIG. 1 is a fragmentary sectional elevation of one example of a fluidised bed constructed in accordance with the invention, FIG. 2 is a scrap view to a larger scale showing a disposition of nozzle or holes in a sparge pipe which is seen in FIG. 1, said nozzles or holes forming outlets for the fluidising gas and showing in addition a means of introducing "lubricating" gas into a layer of relatively coarse and/or dense refractory particles.

FIG. 3 is a plan view of the sparge pipe assembly seen in FIG. 1 for introducing gas into the particulate media of the fluidised bed which in this instance is applicable to a circular container, FIG. 4 is a plan view of an alternative sparge pipe assembly which shows a typical arrangement that might be used for a non-circular container, FIG. 5 is an enlarged scrap view of a low pressure drop injector showing the connection between a sparge pipe and a fluidising gas feed tube, FIG. 6 is a fragmentary sectional elevation of a further example of a fluidised bed constructed in accordance with the invention, FIG. 7 is a scrap section of the lower part of a fluidised bed showing how the sparge pipe assembly seen in FIG. 6 can be insulated by a layer of coarser or denser particles which do not become fluidised, FIG. 8 is a scrap section through a sparge pipe to a larger scale showing one means of ensuring that a slumped or non-fluidised layer of fluidised bed particulate material provides thermal insulation between the fluidised particles and the sparge pipe wall, FIG. 9 is a scrap section taken in the direction of arrow 'A' in FIG. 3 and is to the same scale as is used in FIG. 8.

DESCRIPTION OF EMBODIMENTS OF THE INVENTION

Figure 10:
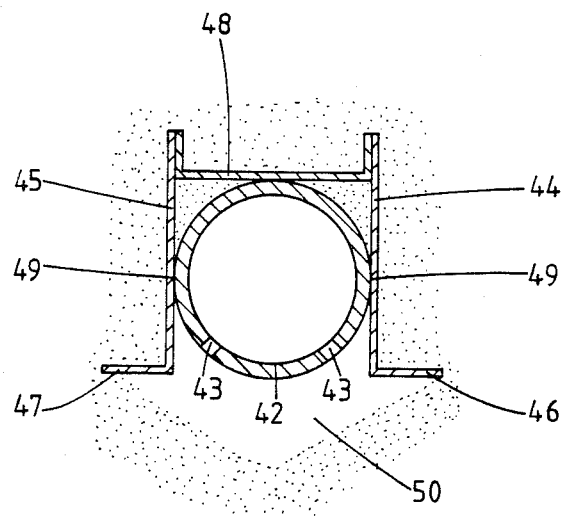
FIG. 10 is a scrap section, on an enlarged scale, of a sparge pipe together with a shield assembly which will result in the formation of a cavity beneath the sparge pipe.

Referring now to the drawings FIG. 1 depicts a fluidised bed which comprises a container 10 in which is disposed a mass of particulate media 11 such as refractory particles. In the example illustrated, said container is surrounded by an annular chamber 12 which is itself surrounded by heat insulating material 13, said annular chamber serving in use as a space for electric heating elements or as a chamber through which hot gases can be passed in order to effect heating of said mass of refractory particles 11 by heat which is conducted through the wall of the container 10. In this example therefore the fluidised bed is heated by heat applied externally of the container but it is to be understood that the present invention is also applicable to arrangements in which gas is introduced into the mass of refractory particles in the form of a combustible mixture which is ignited so as to provide internal or surface heating for the refractory particles. Alternatively solid fuel or small components such as steel balls or various chemical powders may be substituted for the refractory particles.

At the bottom of the container 10 there is provided a sparge pipe assembly. In the example shown in FIGS. 1 and 3 said sparge pipe assembly includes four concentric sparge pipes 14, 15, 16 and 17 in two vertically spaced layers, each of said pipes being of endless (e.g. circular) configuration. Two layers are sometimes used for example when combustible fluidising gas mixtures are introduced into the bed, in which case approximately half the air or oxygen required for combustion is introduced into the bottom layer of sparge pipes 16 and 17 while the gaseous fuel and remaining combustion air is introduced into the top layer 14 and 15. It is however to be understood that only one layer of sparge pipes is needed for most fluidising gases and also that either one or more than two circular sparge pipes may be used in such a layer in alternative designs.

There is also provided two vertically extending gas inlet tubes or pipes namely tube 18 for gaseous fuel and air and tubes 19 for air, which are connected to tangential injectors 21 which in turn are connected to the sparge pipes 14, 15 and 16, 17 so as to be in communication therewith, the arrangement being that pressurised gases which form the gases to fluidise the refractory media 11, will be able to flow via said pipes 18 and 19 through the injectors 21 to the sparge pipes 14, 15 and 16, 17 from sources of supply disposed outside the fluid bed. Thus the tube 18 has two injectors 21 which are connected respectively to the inner and outer rings of the upper layer of the sparge pipe assembly whilst the tube 19 has two injectors 21 which are connected respectively to the inner and outer rings of the lower layer of the sparge pipe assembly. It should be understood that when only one layer of sparge pipe is used then only one gas inlet tube or pipe is required to supply gas to each pair of concentric sparge pipes.

FIG. 4 shows an arrangement of a sparge pipe assembly for use in a container of rectangular or channel-shaped configuration in cross-section. In this arrangement, the endless sparge pipe comprises two generally straight parallel portions 24 connected together at their adjacent ends by a U-shaped end portion 25 and a header portion 26 to provide a closed circuit which permits circulation of gases, which gases are supplied by at least one vertically extending pipe 23 connected to a pair of tangentially disposed injectors 21 which will respectively feed fluidising gases into said parallel portions 24. Said injectors 21 are so disposed as to mutually assist circulation of fluidising gases within the sparge pipe. It should be understood that FIG. 4 shows one sparge pipe assembly whereas in practice a number of such assemblies may be required in a side-by-side or end-to-end relationship for one container and it may be necessary to use two layers of such pipes in the manner as shown in FIG. 1, in which case a second vertically extending pipe 29 would be added together with another pair of tangential injectors 22 in order to supply gas to a second layer of the sparge pipe assembly.

FIG. 5 depicts in greater detail one vertically extended fluidising gas feed pipe 35 connected to a low pressure drop injector 30 which in turn is connected to an endless sparge pipe 31, of which only a short piece is seen in FIG. 5. The injector 30 is inclined at an angle to the axis of the sparge pipe 31 so as to impart a circulatory motion to gases within said sparge pipe. In the example shown an inlet radius 33 and flared end 34 are machined or moulded into the injector in order to reduce pressure drop of the gases passing through the said injector.

It should also be understood that in the assemblies shown in FIGS. 1, 3, 4 and 5 the injectors 21 and 22 and 30 are arranged in a horizontal plane and are fixed to a vertically extending feed tube, but this is only one convenient arrangement and it may be necessary to vertically orientate the injectors so that they enter the sparge pipes from above or below, in which case a horizontally extending supply tube would be necessary.

Each of said sparge pipes 14, 15, 16, 17 and 31 is formed at intervals around its circumference with outwardly projecting nozzles or holes 28, each nozzle or hole being inclined to a vertical direction by an angle of say 40° so that pairs of adjacent nozzles or holes are inclined to the vertical in opposite directions. A pair of adjacent nozzles or holes 28 need not however necessarily be in the same vertical plane. As seen in FIG. 1 a number of vertical tubes 27 are in communication with and connected to the sparge pipes 16 and 17 in order to supply "lubrication" gases to a layer of relatively large and/or dense particles 20 through which such "lubrication" gases permeate before rising into the smaller and/or less dense mass of particles 11 of the fluidised bed, where said gases prevent locking of the particles 11. An orifice 35 is provided within each tube 27 so as to restrict the quantity of lubricating gases to a small proportion (say less than 10%) of the total fluidising gases in use.

The number and size of the aforesaid nozzles or holes 28 will determine the pattern and rates of upward flow of the fluidising gases over the cross-section of the container 10 and consequently such number and size of the outer nozzles or holes can be arranged to provide any desired pattern which may comprise for example an even upward rate of flow across the bed or for rates of flow which are either greater or smaller around the periphery of the bed than in the centre thereof.

It will be appreciated that the above described arrangement in which fluidising gas is introduced by tangentially arranged injectors 21 into the sparge pipes 14, 15, 16, 17 and 31 will produce a swirling or circumferential motion of the fluidising gases within said endless sparge pipe assemblies and such motion will, if the speed of fluidising gas in the rings is sufficiently high suffice to entrain in the recirculatory gas stream any particles which may have penetrated into the sparge pipes via the nozzles or holes 28 when the bed is at rest, such entrained particles then being forced out of the nozzles or holes again so as to clear the sparge pipes and allow for a full and unimpeded flow of fluidising gas through said sparge pipes. Also the recirculating fluidising gases, if of sufficient velocity, will serve to transfer heat from hot zones in said sparge pipes to cooler zones thereof thereby preventing distortion of said pipes. This heat transfer is also assisted by treating the internal surfaces in the sparge pipe in order to increase radiant heat emmision, one such treatment comprising the pre-oxidisation of the metal sparge pipes or roughening the internal diameter of ceramic pipes.

It will be appreciated that the sparge pipe assemblies shown in FIGS. 1 and 3 are arranged so that each layer is located at only one point in plan view, the upper layer being located and supported by feed tube 18 and the lower layer by feed tube 19. Each layer is therefore relatively free to take up thermal expansions or contractions, although in practice it may be limited in its gross movements by any convenient means not shown in the drawings. The arrangement shown in FIG. 4 also fixes one endless sparge pipe by one feed tube so that differential thermal movements can be tolerated by virtue of the long length of the parallel sections of the sparge pipe relative to the comparatively short distance between their centres, thus ensuring that thermal stresses are restricted to an acceptable level.

Referring now to FIG. 6, there is shown therein a fluidised bed which comprises as before a container 10 in which is disposed a mass of particulate media such as refractory particles 11. In the example illustrated said container is surrounded by an annular chamber 12 which is itself surrounded by heat insulating material 13, said annular chamber serving in use as a space for electric heating elements or as a chamber through which hot gases can be passed in order to effect heating of said mass of refractory particles 11 by heat which is conducted through the wall of the container 10, as is described with reference to the construction shown in FIG. 1. As is the case with FIG. 1 therefore the fluidised bed is heated by heat applied externally of the container but it is to be understood that alternatively gas may be introduced into the refractory particles in the form of a combustible mixture which is ignited so as to provide internal or surface heating for the refractory particles. Alternatively solid fuel or small components such as steel balls or various chemical powders may be substituted for the refractory particles. At the base of the container 10 there is provided a sparge pipe assembly comprising a layer of two concentric closed rings 14a and 14b to which fluidising gas is introduced by a vertically extending gas inlet tube or pipe 18a and tangentially arranged injectors 21a.

FIG. 7 shows how the sparge pipes 14a and 14b may be thermally insulated from the fluidised bed particles 11 by means of a bottom layer of coarser and/or denser particles 11a which by reason of higher density or larger size than the fluidised bed particles 11 do not become fluidised and thus prevent heat from readily being transferred by conduction or convection between the said sparge pipe walls and the fluidised bed.

FIG. 8 shows a sparge pipe 14a with a typical disposition of fluidising gas outlet holes or orifices 28 and with discontinuous plates 36 attached to the upper and outer parts of the sparge pipe 14a. In operation, a cone of slumped or non-fluidised particulate material forms on said plates 36 and this, together with a quiescent zone of particulate material 37, insulates the upper section of the sparge pipe 14a and thereby inhibits heat transfer between the fluidised bed particles 11 and said upper section of the sparge pipe. Material of rod section 38 or the like may be welded or fixed to the sparge pipe to provide lateral support and location for the plates 36.

FIG. 9 shows alternative methods of longitudinally locating or fixing the plates 36 to the upper and outer surface of the sparge pipe 14a. Thus, when metal plates are used they may each be fixed by tack welding one end 39 to the sparge pipe upper and outer surface, in which case the rod sections 38 are not required. Alternatively, for use with very high temperature fluidised beds, e.g. above 1050° C., the plates 36 may be made from ceramic material in which case they may be supported laterally on rod sections 38 which are fixed to the sparge pipe 14a and loosely located in a longitudinal direction by pins 40 welded or fixed to the sparge pipe 14, said pins 40 projecting into larger sized holes or apertures 41 in the plates 36.

As previously indicated, any adverse effects that may arise when there is a significant difference between the temperature of the fluidised bed and the temperature of the incoming fluidising gases may also be inhibited by pre-heating (in any convenient manner) the incoming fluidising gases and this expedient may be used as well as or instead of the insulation methods described above.

Figure 11:
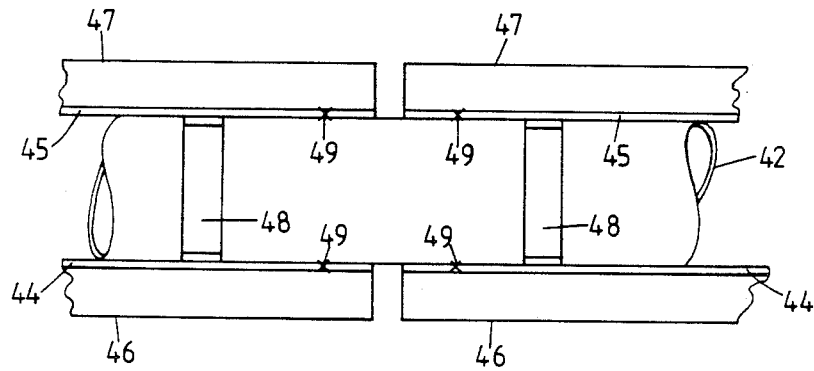
FIG. 11 is a plan view of the arrangement shown in FIG. 10.

Referring now to FIGS. 10 and 11 there is shown therein a sparge pipe 42 which is provide in its lower part with outlet nozzles or holes 43 through which in use the fluidising gases will pass into the fluidised bed. Mounted on said sparge pipe 42 is a shield assembly which comprised a pair of walls 44 and 45 which may be made of any suitable metallic or ceramic material, each of said walls being provided along its lower edge with an outturned flange 46 or 47. Said walls are conveniently interconnected at intervals along their length by means of spaced cross pieces 48 of channel-shaped configuration in cross-section, the sides of said cross pieces 48 being welded to said walls 44 and 45 where the latter are of metallic construction. Said cross pieces 48 will rest on the top of the sparge pipe 42 and the walls 44 and 45 may themselves be welded to the sparge pipe at positions indicated by reference numeral 49.

As will be seen in FIG. 10 the aforementioned flanges 46 and 47 of the above described shield assembly will result in the formation of a cavity indicated by reference numeral 50 beneath the sparge pipe 42. This cavity 50 will enable fluidising gases to pass freely and without impediment through the nozzles or outlets 43 and such free flow of said gases will inhibit the formation of any inequalities in the rate of flow of the gases upwardly through the fluidising bed, thus preventing the formation of any locally slumped or non-fluidised regions in the bed.

INDUSTRIAL APPLICABILITY

The above-described embodiments of a fluidised bed in accordance with the invention possess the undermentioned advantages:

1. Differential thermal expansions or contractions of sparge pipe assemblies for introducing the fluidising gases are reduced by the heat transfer properties of the rapidly recirculating gases in said assemblies. Such heat transfer can be enhanced by roughening or colouring the internal surfaces of the sparge pipes so that radiant heat emissivity and receptivity from and to said surfaces are increased. Furthermore, where, as above-described, the or each sparge pipe is supported at one position (e.g. to a gas feed pipe) stresses which might otherwise arise in the sparge pipe are further reduced or even eliminated.
2. The recirculating fluidising gases in the sparge pipe assemblies can act (by providing a sufficiently high recirculating velocity which is greater than the particle saltation velocity) to eject any particles which may have entered said assemblies via the apertures formed therein whilst the fluidised gas is in an "at rest" or slumped condition. Furthermore, dustcontaminated fluidising gases (which may be preheated) may be used without fear of distortion of the sparge pipe assemblies or without blockages preventing the free flow of said gases.
3. The recirculation of the fluidising gases in the sparge pipe assemblies will ensure that the gas pressure is substantially constant along the length of the circulatory system, thus enabling the sparge pipe apertures to supply the same volumetric gas flow rates for the same aperture area at comparatively low gas pressure drops across the apertures.
4. Particle locking-up, or particle "hysteresis", at start-up is prevented by the even pressure that obtains throughout the fluidising sparge pipe assemblies. Such particle "hysteresis" can be further minimised by providing for the supply of a relatively small quantity of "lubricating" gas which is allowed to percolate from said assemblies into a layer of relatively coarse and/or dense layer of particulate material, disposed at the bottom of the bed. Particle "hysteresis" can also be minimised or eliminated by providing, as above described, a shield assembly which is mounted on a sparge pipe and which acts in use to promote the formation of a cavity beneath the sparge pipe.
5. The use of low pressure drop injectors, coupled with the above-mentioned advantage of a substantially even fluidising gas pressure along the length of the circulatory system permits a reduction in fluidising gas supply pressure.
6. Any variable exit gas flow problems or sparge pipe distortion problems which may arise from temperature differentials of the fluidising gas along the length of a sparge pipe can be minimised by pre-heating the incoming fluidising gas and/or by causing a layer or cone of slumped or non-fluidised particles to form above the sparge pipe (said layer) or by otherwise thermally insulating the sparge pipe.
7. The sparge pipe assemblies as above described (which form the means for introducing and distributing the fluidising gases in the fluidised bed) are relatively inexpensive to manufacture, instal and service. They can readily be made from steel or a ceramic material.

I claim:

1. A fluidised bed comprising a container, a mass of particulate material disposed within the container and an apertured tube or sparge pipe assembly for introducing fluidising gas into the said particulate material, which assembly is supported within the container adjacent to and spaced from the bottom thereof and connected to a supply of fluidising gas disposed externally of the container, characterised in that said sparge pipe assembly comprises at least one sparge pipe which is of continuous endless configuration that permits the fluidising gas to circulate freely in the sparge pipe when said gas is injected therein in a non-radial direction so as to impart a recirculating motion to the gas.

2. A fluidised bed as claimed in claim 1 characterised in that the or each sparge pipe is of circular configuration.

3. A fluidised bed as claimed in claim 2 characterised in that there is provided at least one pair of circular sparge pipes which are disposed in a concentric relationship.

4. A fluidised bed as claimed in claim 1 characterised in that the or each sparge pipe comprises a pair of substantially straight parallel portions which are connected at their opposite ends by a pair of end or header portions.

5. A fluidised bed as claimed in claim 1 characterised in that there are provided a plurality of sparge pipes which are disposed in at least two vertically spaced layers.

6. A fluidised bed as claimed in claim 1 characterised in that the or each sparge pipe is connected to a fluidising gas feed pipe by means of at least one tangentially inclined injector.

7. A fluidised bed as claimed in claim 1 characterised in that there is provided at the bottom of the bed a layer of particles which are coarser and/or denser than the remainder of the bed particles.

8. A fluidised bed as claimed in claim 7 characterised in that a plurality of downwardly projecting sparge pipe outlets are provided which extend into said layer of coarser and/or denser particles and which are arranged in use to inject a flow of "lubricating" gas into said layer, the volume of lubricating gas thus injected in any given time forming a relatively small proportion of the total volume of fluidising gas issuing from the sparge pipe assembly at the same time.

9. A fluidised bed as claimed in claim 1 characterised in that the fluidising gas is fed into the sparge pipe assembly at a speed which is sufficient to eject any bed particles which may enter the sparge pipe assembly apertures whilst the bed is in an "at rest" or slumped condition.

10. A fluidised bed as claimed in claim 1 characterised in that the outlet apertures in the or each sparge pipe through which in use the fluidising gas will flow into the particles which are to be fluidised project downwardly in directions which are inclined to the vertical.

11. A fluidised bed as claimed in claim 1 characterised in that the or each sparge pipe is provided with a shield assembly which comprises a pair of spaced wall portions which respectively engage opposite sides of the sparge pipe, each wall portion having at its lower end an outturned flange, said shield assembly being adapted to form beneath the sparge pipe a cavity which is free from particulate material and which extends at least to the sparge pipe outlet apertures for the fluidising gas.

* * * * *